Feb. 3, 1970  T. M. JOHNSON  3,493,216
AERATION OF LIQUIDS

Filed April 10, 1968  2 Sheets-Sheet 1

INVENTOR
THOMAS M. JOHNSON

ATTORNEY

Feb. 3, 1970        T. M. JOHNSON        3,493,216
                    AERATION OF LIQUIDS

Filed April 10, 1968                     2 Sheets-Sheet 2

INVENTOR
THOMAS M. JOHNSON

ATTORNEY

United States Patent Office 3,493,216
Patented Feb. 3, 1970

3,493,216
AERATION OF LIQUIDS
Thomas M. Johnson, 1031 19th Ave. N.,
Texas City, Tex. 77590
Filed Apr. 10, 1968, Ser. No. 720,747
Int. Cl. C02d 1/00; C02b 1/58; B01d 47/00
U.S. Cl. 261—36                                12 Claims

ABSTRACT OF THE DISCLOSURE

An apparatus for aerating liquids which comprises a substantially centrally disposed vertical liquid conduit surrounded by a downwardly sloping inclined surface, said inclined surface being divided into a pluarlity of drainage segments each containing a pluarity of vertical baffles, said vertical baffles being positioned with respect to one another and the drainage segment so as to provide within each of said drainage segments an alternating right and left flow path for liquid descending said inclined surface from said vertical liquid conduit. A means for forcing the liquid to be aerated up through said vertical liquid conduit and out onto the inclined surface is provided as a part of said apparatus for aerating liquids.

BACKGROUND OF THE INVENTION

The present invention relates to an apparatus for areating liquids. More particularly, the present invention relates to an apparatus for increasing the dissolved oxygen content of liquids, i.e., waste water, and reducing the content of organic or biodegradable material in various liquids, particularly water.

The disposal of liquids contaminated with various organic and other pollutants is one of the major problems facing society. Because of the volume produced, disposal of such liquids is virtually impossible. Generally, the contaminated liquid is treated to remove or neutralize the contaminating materials. One of the most common treating methods is that of subjecting the contaminated liquid to aeration which provides for an exposure and mixing of the contaminated liquid with oxygen usually in the form of atmospheric air.

A primary requirement for good aeration equipment is that it provides a maximum exposure and mixing of the contaminated liquid with air or oxygen with a minimum of energy input. This requirement has led to development of apparatus providing for the liquid to be aerated to be trickled, usually by gravity flow, through areas packed with irregular stones or other such packing materials which provide for a large liquid surface area for exposure to oxygen. However, such aeration equipment easily becomes fouled by precipitated materials or bacterial growth and when such occurs, is difficult to clean. Because of such deficiencies and the importance of aeration in the treatment of contaminated liquids, there is a continuous need for new and improved means for efficient and inexpensive aeration.

It is an object of the present invention to provide a new and novel apparatus for commingling gases and liquids.

Another object of the present invention is to provide a new and novel apparatus for aerating liquids.

An additional object of the present invention is to provide a new and novel apparatus for aerating liquids whereby an efficient and effective exposure of the liquid to be aerated to amospheric air or oxygen is obtained.

Still another object of the present invention is to provide a new and novel apparatus for aerating liquids which is easy and inexpensive to operate and maintain.

A remaining object of the present invention is to provide a new and novel aeration apparatus which is buoyant and can be floated on the surface of the liquid to be aerated.

Yet another object of the present invention is to provide a new and novel aeration apparatus which permits a more constant discharge rate of liquid through the apparatus.

Additional objects will become apparent from the following description of the invention herein disclosed.

SUMMARY OF THE INVENTION

The present invention, which fulfills the above and other objects, is an apparatus for aerating liquids, said apparatus comprising a substantially centrally disposed vertical liquid conduit surrounded by a downwardly sloping inclined surface, said inclined surface being divided into a plurality of drainage segments each containing a plurality of vertical baffles, said vertical baffles being positioned with respect to one another and said drainage segment so as to provide within each of said drainage segments an alternating right and left flow path for liquid descending said inclined surface from said liquid conduit, and a means for forcing liquid to be aerated up through said vertical liquid conduit and out onto the inclined surface.

The aeration apparatus described herein is simple of construction yet provides for a highly effective and efficient contact of liquid to be aerated with the oxygen of atmospheric air. This apparatus is easily and inexpensively operated requiring external energy only to lift the liquid to the top of the inclined surface. Maintenance is simple and inexpensive usually requiring no more than to be swept off with a broom. The present aeration apparatus is readily adapted for flotation on the surface of the body of the liquid to be aerated and as a result of such flotation, a constant liquid discharge rate through the apparatus is readily obtained.

DESCRIPTION OF THE PREFERRED EMBODIMENTS

Figure 1:
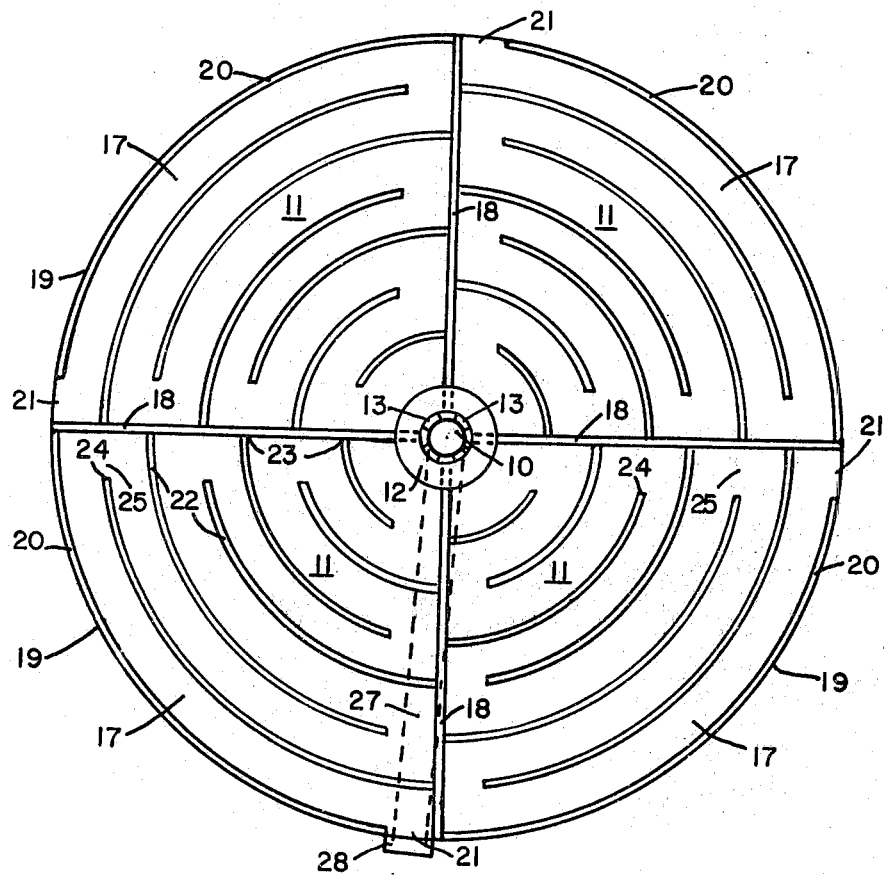
FIGURE 1 of the drawings is a top view of an embodiment of the aeration apparatus of the present invention.

To further describe the present invention in its preferred embodiments, reference is made to the accompanying drawings. In the drawings, the same reference characters are used throughout to designate like features of the present invention.

Referring to the drawings, the apparatus of the present invention is provided with a vertical liquid conduit 10 which is centrally disposed with respect to downwardly sloping inclined surface 11 which extends from and surrounds liquid conduit 10. A pump 12 is provided as means for forcing the liquid to be aerated up through liquid conduit 10 and out of liquid conduit 10 through ports 13 from which the liquid descends the surface of inclined surface 11.

By providing a lower surface 14 enclosing an air space 15 underneath inclined surface 11, the apparatus of the present invention is readily made buoyant and adapted for flotation upon the surface of the body of the liquid to be aerated. However, the present aeration apparatus may be connected to piers which may provide a fixed support for the apparatus or may merely serve as guides upon which the present apparatus is raised or lowered as desired or as the surface level of the liquid to be aerated rises or falls. While the apparatus of the present invention is described above in relation to being positioned on or over the body of liquid to be aerated, the present apparatus may be positioned over a drain or sump and the liquid piped from some other source to and up through liquid conduit 10. In such adaptation, of course, it may not be necessary to have pump 12 as part of the apparatus as illustrated in the drawings. A particularly useful adaptation of the present invention includes flotation of the present aeration apparatus upon the surface of the body of the liquid to be aerated. Such adaptation provides for a constant discharge rate for the liquid through the aerator.

Liquid conduit 10 preferably comprises a single conduit as shown in the drawings. However, liquid conduit 10 may be comprised of a plurality of grouped together conduits. Usually, the liquid conduit will terminate at its upper end at or just above the uppermost edge of inclined surface 11. The length of liquid conduit 10 will vary depending on the particular utilization of the apparatus of the present invention, the only requirement being that it be of sufficient length to be in contact with the liquid to be aerated or a source of such liquid.

Inclined surface 11 provides a drainboard over which liquid passing from ports 13 of liquid conduit 10 may flow downward in a relatively thin film of liquid thereby exposing a large surface area of liquid to atmospheric air. Oxygen from such atmospheric air is thereby absorbed in the liquid in significant quantities thus ultimately resulting in a substantial reduction in content of organic or biologically degradable materials present in the liquid and/or a substantial increase in the supply of oxygen to meet demands for chemical oxygen in the liquid.

Figure 2:
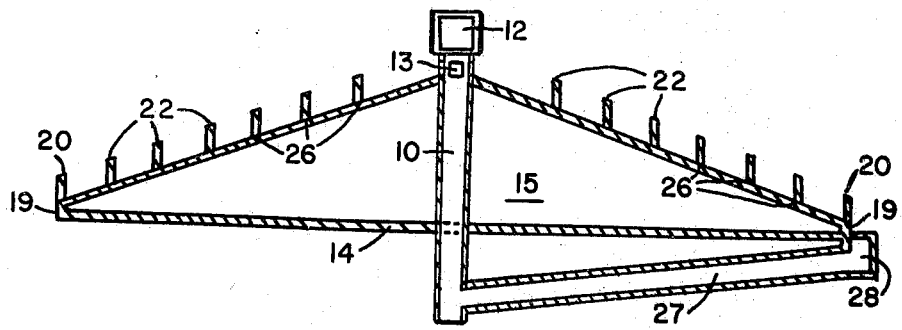
FIGURE 2 of the drawings is a cross-sectional view of an embodiment of the aeration apparatus of the present invention.
Figure 3:
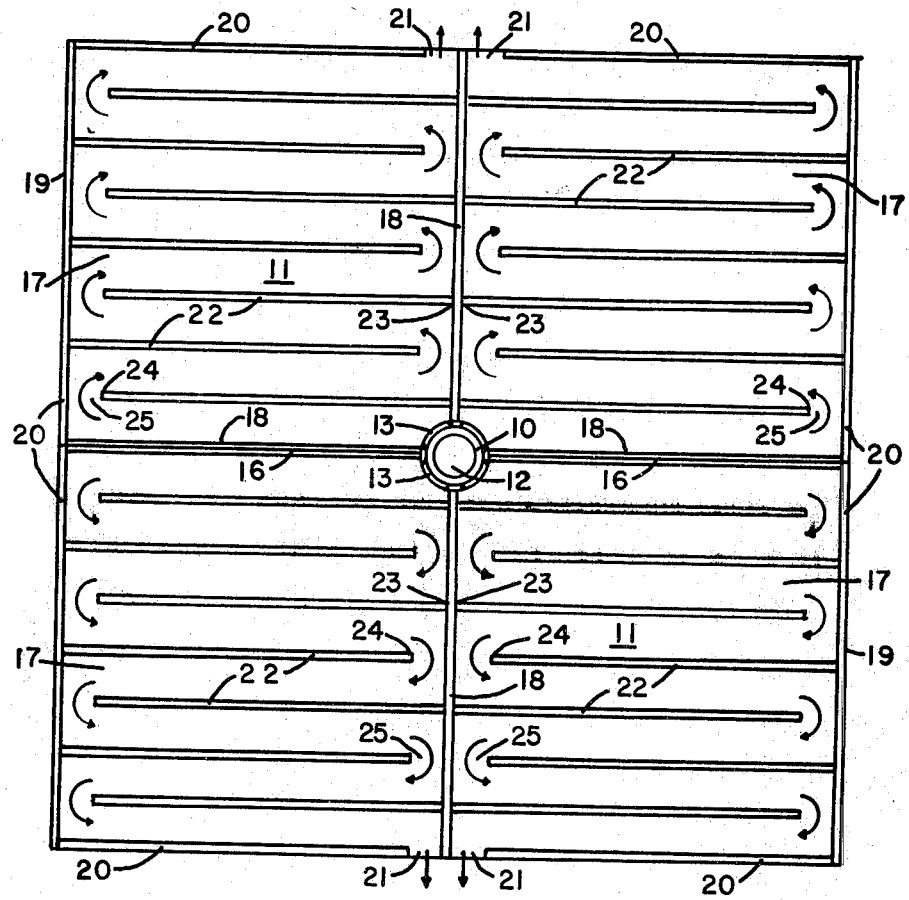
FIGURE 3 of the drawings is a top view of another embodiment of the aeration apparatus of the present invention.
Figure 4:
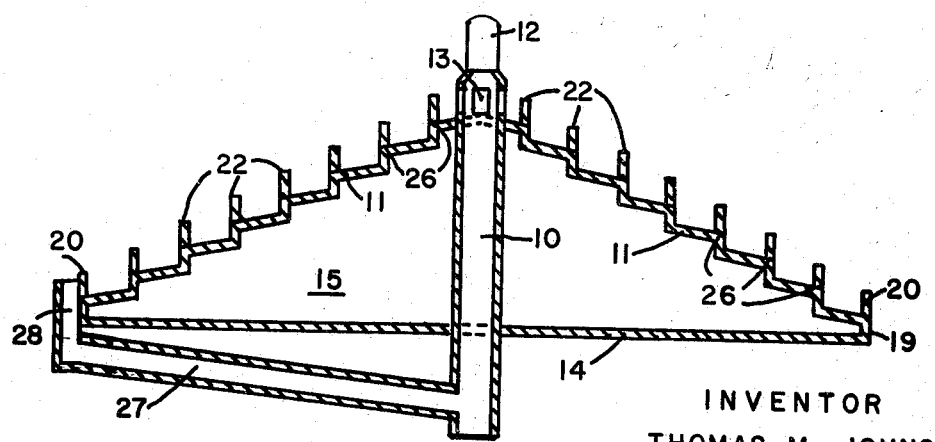
FIGURE 4 of the drawings is a cross-sectional view of an embodiment of the aeration apparatus of the present invention illustrating an embodiment different from that shown in FIGURE 2.

The shape or configuration of the inclined surface 11 may vary considerably. The surface itself, as viewed in cross section, may be in a continuously sloping plane sloping downward from liquid conduit 10 as illustrated in FIGURE 2. Alternatively, again as viewed in cross section, the inclined surface 11 may comprise a series of stepped-down surfaces lying in different planes with the planes descending in level as they become more distant from the top of liquid conduit 10. Generally, in this embodiment, an imaginary line drawn, as indicated by line as in FIGURE 4, through the cross-sectional midpoints of the individual planes would be a substantially straight sloping line. As illustrated in FIGURES 1 and 2, inclined surface 11 may take the shape of a cone with liquid conduit 10 extending through the apex of said cone. In an alternate embodiment, inclined surface 11 may comprise two or more substantially flat segments joined at edges thereof. For example, as illustrated by FIGURE 3, two substantially first rectangular surfaces are joined at edges 16 to thereby divide inclined surface 11 into two separate segments each continuously sloping downward from the line of joinder of edges 16 and at all places on said segments sloping downward from the upper end of liquid conduit 10. In this embodiment, liquid conduit 10 extends through inclined surface 11 at or near the midpoint of the line of joinder of edges 16 of the segments of inclined surface 11. In other embodiments, three, four, five, six or even more individual flat surfaces may be joined at edges thereof to make up inclined surface 11. So long as the segments joined provide a surface which surrounds the liquid conduit and slopes downward from such liquid conduit, then joinder of such segments, regardless of number or shape, is within the spirit and scope of the present invention.

Regardless of shape or configuration, inclined surface 11 is divided into a plurality of drainage segments 17. These drainage segments 17 are divided from one another by vertical partitions 18 which generally extend radially from liquid conduit 10 along and joined to inclined surface 11. Vertical partitions 18 extend from liquid conduit 10 to near the peripheral edge 19 of inclined surface 11. These vertical partitions 18 serve to maintain separate the flow of liquid along inclined surface 11 within each of drainage segments 17. When the inclined surface comprises two or more flat surfaces joined at edges thereof as hereinabove described, in many instances drainage segments 17 will be coextensive in area with such flat surfaces.

Though as few as two drainage segments 17 may be provided, generally it is preferred that at least four such drainage segments be provided. As a practical matter, seldom will more than six drainage segments be employed. Most often, ports 13 of liquid conduit 10 are so arranged that each of drainage segments 17 will receive a proportion of the total liquid discharged from liquid conduit 10 substantially equal to the proportion of the surface area of such drainage segment to the total surface area of inclined surface 11. While the drainage segments 17 of inclined surface 11 may vary in size and shape with respect to each other, it is preferred that all of the drainage segments 17 of a particular inclined surface be substantially of equal surface area, inclination and shape.

Quite often, the apparatus of the present invention includes a vertical peripheral wall 20 which extends vertically from at or near the peripheral edge 19 of inclined surface 11. Peripheral wall 20 usually will extend along the peripheral edge 19 from one vertical partition 18 to adjacent an opposite vertical partition 18 of a drainage segment 17 thereby leaving an exit opening 21 between said opposite vertical partition and the free, non-joined end of said peripheral wall 20 adjacent thereto, said exit opening 21 allowing aerated liquid to exit the apparatus of the present invention.

Each of drainage segments 17 contain a plurality of vertical baffles 22 which direct the flow of the liquid along the surface of inclined surface 11. Each of vertical baffles 22 have a joined end 23 which is joined to or in substantial contact with a vertical partition 18, or the peripheral wall 20, and a non-joined or free end 24. An opening 25 is thereby provided between free end 24 and the nearest adjacent vertical partition 18 or segment of peripheral wall 20. The base 26 along which each baffle 22 is joined to or in substantial contact with inclined surface 11 generally lies substantially in a horizontal plane or substantially in a plane which slopes gently from the joined end 23 to the free end 24 of the vertical baffle 22. The vertical baffles 22 may be substantially flat and lie substantially in a single vertical plane as illustrated in FIGURE 3 or when inclined surface 11 is conical in shape, vertical baffle 22 may be arcuate in form as shown in FIGURE 1. The term "vertical" as used in reference to vertical baffles 22 may mean vertical with respect to the horizontal, vertical or perpendicular with respect to the surface of inclined surface 11, or in an angular relationship to inclined surface 11 somewhere between these two. The purpose of vertical baffle 22 is to obstruct and direct the flow of liquid as it passes downward across inclined surface 11 and if vertical baffle is vertical under any of these three definitions of the term, then such baffle will fulfill its purposes in the apparatus of the present invention.

All of the vertical baffles 22 of a particular drainage segment 17 are joined to inclined surface 11 such that the bases 26 of such vertical baffles are substantially parallel to one another. Further, the vertical baffles 22 within each of drainage segments 17 are arranged such that alternate vertical baffles 22 are joined at opposite ends 21 to vertical partitions 18 or a segment of peripheral wall 20 of such drainage segment 17. Such arrangement results in openings 25 within each drainage segment 17 being alternately adjacent opposite vertical partitions 18 or segments of peripheral wall 20 of such drainage segment 17. As a result of this arrangement of vertical baffles 22 and the openings 25, liquid flowing downward within each drainage segment 17 along inclined surface 11 from liquid conduit 10 is caused to flow back and forth from one side to the other of said drainage segment. Such flow direction results in the length of the flowpath of liquid from liquid conduit 10 to exit opening 21 of each drainage segment 17 being substantially increased. By so increasing the flowpath of the liquid, the liquid is exposed to a substantially greater contact with oxygen than if such liquid flowed straight down inclined surface 11.

To provide for more rapid distribution of oxygen in the liquid to be aerated near the surface of a body thereof, it is often desirable to immediately recycle a portion of the aerated liquid back through the aeration apparatus of the present invention. Such recycle may be accomplished by providing a return tube 27 which opens into liquid conduit 10 and extends from liquid conduit 10 to return collection bowl 28 below an exit opening 21 of one or more drainage segments 17. The return tube 27 provides for all or part of the effluent from one or more drainage segments 17 to be reintroduced into liquid conduit 10 whereby it is again distributed through ports 13 onto inclined surface 11. The number and arrangement of return tubes 27 will vary with the objects of the particular utilization of the apparatus of the present invention and the desires of the user and may be readily ascertained by those skilled in the art.

The means generally employed for forcing the liquid to be aerated up through liquid conduit 10 comprises a mechanical pump. Selection of the particular type of pump is well within the ability of those skilled in the art and is not deemed to require any teaching herein. The particular means selected for forcing liquid up through liquid conduit 10 does not constitute a limitation on the present invention and any such means may be used.

The apparatus of the present invention has utility in virtually any situation wherein aeration of a flowable liquid is desired. It can be readily heated by placing heating coils under inclined surface 11 to thereby increase flowability of viscous liquid or prevent freezing of liquids in cold climates. It is particularly useful when applied to the aeration of water requiring oxygen for the decomposition or neutralization of contaminants therein.

Materials useful in construction of the present apparatus will vary depending on the location and specific utilization of the apparatus. In general, various metals, plastics and wood are useful as materials of construction. The optimum material of construction depends on the material to be aerated, climate, size of the apparatus and other like considerations.

What is claimed is:

1. An apparatus for aerating liquids, said apparatus comprising a substantially centrally disposed vertical liquid conduit surrounded by a downwardly sloping inclined surface, said inclined surface being divided into a plurality of drainage segments each containing a plurality of vertical baffles, said vertical baffles being positioned with respect to one another and said drainage segments so as to provide within each of said drainage segments an alternating right and left flow path for liquid descending said inclined surface from said liquid conduit, and a means for forcing liquid to be aerated up through said vertical liquid conduit and out onto the inclined surface.

2. The apparatus of claim 1 wherein said downwardly sloping inclined surface is substantially conical in shape.

3. The apparatus of claim 1 wherein said downwardly sloping inclined surface comprises two substantially flat rectangular surfaces joined at an edge thereof.

4. The apparatus of claim 1 wherein said downwardly sloping inclined surface comprises a series of joined stepped-down surfaces lying in different planes with said planes descending in level as the distance of said planes increases from said liquid conduit.

5. The apparatus of claim 1 wherein said downwardly sloping inclined surface is divided into a plurality of drainage segments of substantially equal surface area.

6. The apparatus of claim 5 wherein the number of drainage segments is four.

7. The apparatus of claim 1 wherein said downwardly sloping inclined surface is divided into said plurality of drainage segments by means of vertical partitions extending radially from adjacent said liquid conduit to the peripheral edge of said inclined surface.

8. The apparatus of claim 1 wherein said vertical baffles are joined at one end thereof to a flow obstruction means and non-joined at the other end to thereby provide a liquid flow path from said joined end to and around said non-joined end, said vertical baffles within each of said drainage segments being joined at alternate ends to such flow obstruction means thereby causing said liquid to flow back and forth across said inclined surface as said liquid descends said inclined surface.

9. The apparatus of claim 8 wherein the base of each of said vertical baffles lies in a substantially horizontal plane.

10. The apparatus of claim 1 wherein a recycle return tube is provided for returning at least a portion of the effluent of at least one of said drainage segments to said liquid conduit for return through said liquid conduit to said inclined surface.

11. The apparatus of claim 1 wherein said means for forcing the liquid to be aerated up through said liquid conduit is a mechanical pump.

12. The apparatus of claim 1 wherein the bases of said vertical baffles within each of said drainage segments are substantially parallel to one another.

References Cited

UNITED STATES PATENTS

| 448,416 | 3/1891 | Dorsey | 210—150 X |
| 1,455,930 | 5/1923 | Nobis | 261—112 X |
| 1,876,142 | 9/1932 | Jones | 261—112 X |
| 2,865,617 | 12/1958 | Dickens et al. | 210—150 X |

FOREIGN PATENTS

| 362,135 | 7/1919 | Germany. |
| 438,627 | 5/1912 | France. |

HARRY B. THORNTON, Primary Examiner

S. H. MARKOWITZ, Assistant Examiner

U.S. Cl. X.R.

55—241; 261—112, 120